Feb. 3, 1959 G. P. GUZAK 2,871,581
MATHEMATICAL GAME
Filed Aug. 1, 1956 2 Sheets-Sheet 1

INVENTOR.
George P. Guzak.
BY
Thiess, Olson, Mecklenburger,
von Holst, & Coltman.

Feb. 3, 1959
G. P. GUZAK
2,871,581
MATHEMATICAL GAME
Filed Aug. 1, 1956
2 Sheets-Sheet 2
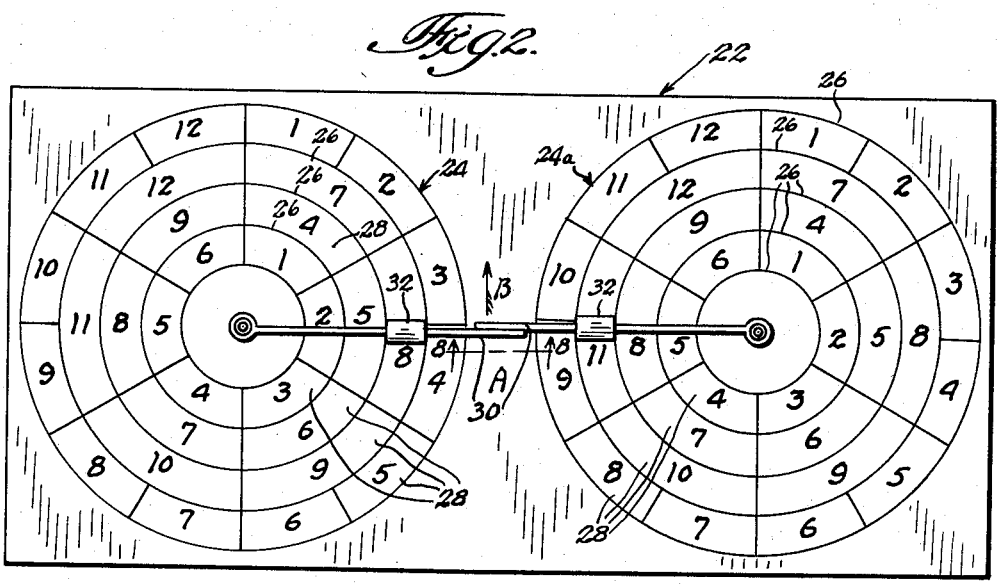
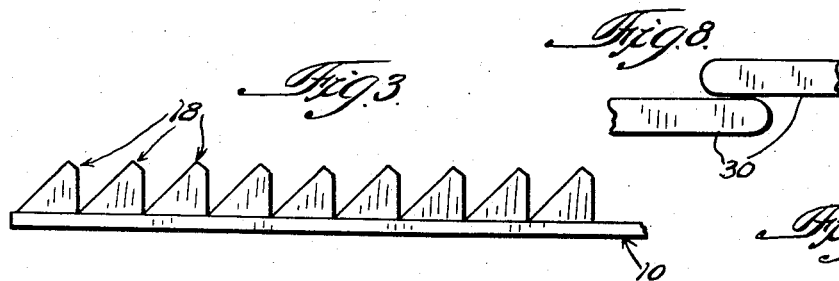
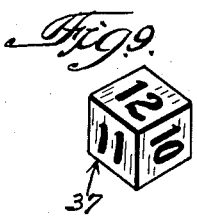
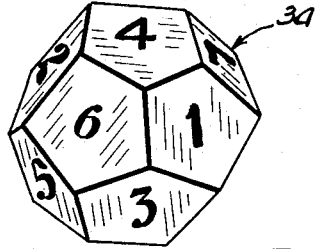
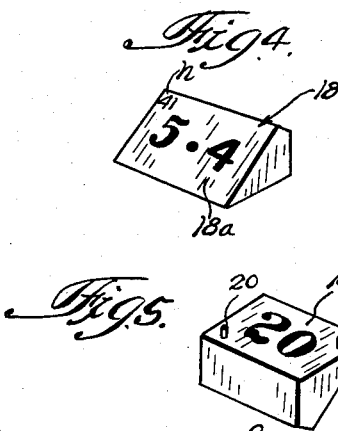
INVENTOR.
George P. Guzak.
BY
Thiess, Olson, Mecklenburger,
von Holst, & Coltman.
ATTYS.

United States Patent Office 2,871,581
Patented Feb. 3, 1959

2,871,581

MATHEMATICAL GAME

George P. Guzak, Chicago, Ill.

Application August 1, 1956, Serial No. 601,521

10 Claims. (Cl. 35—31)

This invention pertains to a novel mathematical game and more particularly pertains to a game intended to teach the multiplication tables.

It is well known that teaching mathematics to children of grammar school age is frequently difficult. The basis for this difficulty undoubtedly lies in the abstract nature of the subject being taught. This attribute of mathematics is repugnant to the minds of children which are by nature highly imaginative.

It is an object, therefore, of this invention to provide a game which is not only interesting and pleasant to play, but in addition is an effective means of teaching the multiplication tables.

It is a further object of this invention to provide a flexible game for effectively teaching all or desired portions of the multiplication tables to children of grammar school age.

It is a still further object of this invention to provide a mathematical game which may be played by any number of children and a game in which the children who are onlookers will, as a matter of course, mentally perform the mathematical gymnastics required by the child playing at any one instant.

The above and other objects of this invention will become more apparent upon proceeding with the following detailed description when read in the light of the accompanying drawings and appended claims.

In one embodiment of this invention a game board is provided which is preferably rectangular in configuration. A consecutive series of numerals is disposed along one edge thereof and a second set of numerals is disposed along a second edge of the game board which intersects with the first-mentioned edge. The two series of numerals commence at the corner of numeral intersection of the game board and progressively increase as they proceed away therefrom. Disposed normally to each number of each group is a game board column. Consequently at the intersection of two columns disposed normally to a number in each of the two above-mentioned groups, a square will be defined. Appearing in each of these squares is the numerical product of the two numbers with which the square is in alignment. It is thus apparent that the game board comprises a plurality of squares in alignment with numbers in two series disposed along the game board edges. In each square the product of the two numbers with which the square is in alignment is disclosed therein.

Game pieces to be utilized in conjunction with the above-described game board comprise blocks having an upper inclined surface on which are disposed a multiplier and a multiplicand. On the bottom surface of the game piece, which surface is hidden from view, is printed the product of the multiplier and multiplicand disposed on the upper visible surface of the game piece. Each game piece is positioned on a square of the game board having a product disclosed in the square which is identical with the product found on the game piece bottom surface.

Also used in conjunction with the game board are means which indicate to the player which game piece is to be removed from the game board. Such means may comprise two die members which are thrown by the player. The two numbers which face up after the throw direct the player to the game piece on the game board having the identical numbers disclosed on its upper surface. It is the object of the game for the player, once he is confronted with a given multiplier and multiplicand, to give the product of the same. Consequently, after the player has thrown the dice he will look at the board, pick out the game piece having an identical multiplier and multiplicand, and before he moves the piece from the board state the product of the two numbers. The player and all who play with him will readily find the correct product, if not known, of the multiplier and multiplicand by removing the game piece from the board. The product will be found on the game board and on the bottom surface of the game piece. Obviously the product need not be on both the game piece and board; thus the game piece bottom surfaces may be blank if desired.

The number of turns each player may have is a matter of choice, and the game is won by giving the greatest number of correct answers.

For a more complete understanding of this invention reference should now be had to the drawings, wherein:

Figure 1 is a plan view of the game board to be utilized in the subject invention;

Fig. 2 is a plan view of a means for determining a multiplier and multiplicand to be used by a player playing the subject game;

Fig. 3 is a fragmentary side elevational view of the game board of Fig. 1 having disposed thereon game pieces which are utilized in conjunction therewith;

Fig. 4 is a front perspective view of a game piece to be utilized with the subject game;

Fig. 5 is a bottom perspective view of the game piece of Fig. 4;

Fig. 6 is a perspective view of a twelve-sided die member which is an alternate means for determining a multiplier and multiplicand;

Fig. 7 is a perspective view of a six-sided die member which may be utilized for determining a multiplier or a multiplicand between 1 to 6;

Fig. 8 is a fragmentary elevational view taken on line 8—8 of Fig. 2;

Fig. 9 is a perspective view of a six-sided die member which may be utilized for determining a multiplier or multiplicand between 9 through 12, and Fig. 10 is a perspective view of a six-sided die member which may be utilized for determining a multiplier or multiplicand between 4 through 9.

Referring now more particularly to Fig. 1, a game board 10 is illustrated which is of rectangular configuration and which has a series of consecutive members running from 1 to 12 arranged along its upper longitudinal edge and which has a second series of numbers from 1 to 12 arranged along the left side-defining edge. One series 14 may be construed as a series of multipliers, and the other series 16 as a series of multiplicands. It will also be noted that each of the series commences at the corner of intersection, that is, at the upper left-hand corner of the game board illustrated.

Normally disposed to each number in each series is a column defined by the lines 12 or 13 which run the length and width of the board, respectively. It is apparent that the column lines 13 disposed normally to the multipliers 14 disposed along the top longitudinal edge of the game board 10 upon intersecting with the column lines 12 disposed normally to the multiplicand numerals 16 disposed along the left side-defining edge of the board will form squares which are uniformly distributed over the entire board surface. On each of the squares a product is printed which corresponds to the product of the multiplier and multiplicand with which the particular square is in alignment. It is thus apparent that at the intersection of columns drawn normally to a multiplier and a multiplicand a product will be readily found on the game board surface. Although each of the series 14 and 16 are illustrated as running from 1 to 12, it is apparent that the length of each series may be as short or as long as desired.

It is intended in the normal course of play that game pieces such as is illustrated in Figs. 4 and 5 be utilized in conjunction with the game board 10. Each game piece 18 may be somewhat wedge-like in configuration and has printed on an upper inclined surface 18a a multiplier and a multiplicand (see Fig. 4). Each game piece 18 has printed on a bottom surface 18b the product of the multiplier and multiplicand disposed on its upper inclined surface. In its normal position each game piece 18 will be arranged on the game board so as to rest on its bottom surface 18b whereby the product will be hidden from view. Game piece 18 will also be arranged on the game board 10 in such a manner so that the multiplier and multiplicand will be facing the player and readily seen by him.

Preliminarily to commencing play with the provided game, each of the squares of the game board 10 illustrated in Fig. 1 has positioned thereon a game piece 18. Two game pieces are shown in place on the board 10 in Fig. 1. Each game piece will have printed on its upper inclined surface 18a a multiplier and multiplicand which corresponds with the multiplier and multiplicand with which the square on which the game piece is positioned is in alignment.

To facilitate the initial disposition of the various game pieces 18 on their proper game board squares, each square of the game board has a position number $n$ printed in its upper left-hand corner, and each game piece 18 has a corresponding position number $n$ in the upper left-hand corner of its upper inclined surface 18a. Thus to prepare the game board and the game pieces for play, the number of the game piece is checked with a corresponding position number on the game board 10, thereby to facilitate preparation of the board and pieces for play.

Means may be utilized which will fixedly position each game piece on its proper game board square. For instance, projecting studs 20 may be formed integrally with the bottom surface 18b of each game piece 18. These studs are intended to interlock with the apertures 22 which may be positioned in each square of the game board 10 as illustrated in the square 41 illustrated in Fig. 1. It is believed obvious in view of the foregoing description that the game piece 18 illustrated in Figs. 4 and 5 would be properly locked in square 41 of the game board in the normal playing position.

It is the object of this game to present the children who are engaged in playing the same with a multiplier and multiplicand. The child must then substantially instantaneously give the product of the two numbers. With the game board illustrated in Fig. 1, the child whose turn it is in the game may be presented with a multiplier and a multiplicand, each of which may range from 1 to 12. Assuming that the child was presented with a multiplier 4 and a multiplicand 5, he would glance at the game board (Fig. 1) on which the game pieces 18 illustrated in Figs. 4 and 5 would be placed. A side elevation of such a board and game piece assembly is illustrated in Fig. 3. To find the appropriate game piece, that is, the game piece pertaining to his problem, the child would glance along the top edge of the game board illustrated in Fig. 1 until he had visually located the multiplier 4 and would then glance along the left side-defining edge of the game board until the multiplicand 5 was located. Where the columns normally disposed to these two numerals intersect, the pertinent game piece would be positioned. This would be the game piece illustrated in Fig. 4. The multiplier and multiplicand would be disposed on its upper inclined surface. The child would be required to give the product of these two numbers before he has removed the same from the board. His answer may be readily checked by all playing the game by merely glancing at the game board square on which this play piece had been disposed. According to the rules of the game, if the child has correctly answered his problem in multiplication he may either be given another chance or else given credit for his correct answer and play will continue with another child in the group.

Means are provided for use in conjunction with the illustrated game board 10 and game pieces 18 for providing the child with a random multiplier and multiplicand. Such means may comprise the spinner board 22 illustrated in Fig. 2. On the spinner board are disposed two dial members 24 and 24a. Each of the dial members comprises a series of concentric rings 26, and each ring is in turn divided into segments 28 in which one number is disposed. Rotatably mounted in the center of each dial 24 and 24a are spinner members 30. As illustrated in Fig. 2, the two spinner members project from the center of the dial on which they are rotatably mounted so as to mutually overlap when directed toward each other. To simultaneously rotate the two spinner members 30 they are merely spun with a fingernail in a manner which will impart rotational movement to the two spinners. It will be noted from Fig. 8 that each member 30 spins freely since there is a clearance between the two spinner members in the vertical plane. After the two spinners 30 have come to rest, one numeral from each dial is presented to the child playing the game. The numeral from the first dial 24 may be a multiplier and that from the dial 24a may be multiplicand.

The ring 26 of each dial 24 and 24a which is to be utilized in the presentation of the multiplier and multiplicand to the child engaged in the game will depend upon his age and mathematical ability. For instance, if a child has just started ot learn the multiplication tables the innermost ring of the illustrated dial will be utilized with the spinner members 30. Consequently the child cannot be confronted with a multiplier and multiplicand which exceeds 6. However, as the child progresses in age and in ability, another ring 26 of the illustrated dials 24 and 24a will be utilized in obtaining a multiplier and multiplicand. Thus, if the second ring of the illustrated dial is utilized with the spinner members 30, the multiplier and multiplicand which a child will receive in the course of the game will run from 4 through 9. If the third outermost ring of the illustrated dial members is utilized the multiplier and multiplicand will run from 7 to 12, and if the outermost ring of the illustrated dial members is utilized the multiplier and multiplicand may be any numeral from 1 through 12.

To facilitate reading of the numbers in any one ring, a movable indicator such as indicators 32 which are slidable on each of the spinner members 30 may be utilized. The indicators 32 are preferably colored so as to contrast with the underlying dial member and readily indicate to the child playing the game which numbers are to be multiplied and the product thereof given.

It is thus seen that in the normal course of playing the provided game, the child may spin spinner members 30 of the multiplier dial 24 and multiplicand dial 24a illustrated. Depending upon where the spinner members 30 come to rest and upon which circle of the respective dials is utilized, a multiplier and multiplicand is provided the child. Having been provided with the two numbers to be multiplied, the child will refer to the game board 10 of Fig. 1 on which the game pieces 18 are disposed. Having located the game piece having the multiplier and multiplicand with which he has been provided on its upper inclined surface he will state the product aloud before removing the game piece from the game board. If his answer is correct he will be entitled to another chance or receive a game point which will be counted toward a final sum which will determine the eventual winner.

An alternate means for providing children playing the subject game with random multipliers and multiplicands comprises twelve-sided die members, one of which is illustrated in Fig. 6. Two of these die members are to be used simultaneously. Upon throwing the dice the child whose turn it is in the game will be provided with a multiplier and multiplicand. The latter two numbers will be obtained from the die surfaces which remain uppermost after the dice have been thrown. The child then follows the above-described procedure by referring to the game board 10, finding the appropriate game piece, and saying aloud the product before he has removed the game piece from the board. Dice 34 of Fig. 6 are to be utilized if the child playing the game has so advanced in his multiplication as to be capable of multiplying numbers from 1 to 12.

However, if the child playing the game is young in age, dice 36, one of which is illustrated in Fig. 7, which are the common six-sided dice, may be utilized. Obviously, with the latter die members a child who has thrown the same cannot be confronted with a multiplier or multiplicand over 6. The latter die members will still be used with the provided game board 10 of Fig. 1. However, the area of the board to be used with such dice will be only that area subtended by the multipliers and multiplicands 1 to 6. Various segments of the multiplication tables may be arranged on six-sided dice. For instance, in Fig. 9, numerals 7 to 12 are disposed on the six sides of the illustrated die 37, and in Fig. 10 numerals 4 through 9 are arranged on the six sides of illustrated die member 39. Learning pre-selected portions of the multiplication tables may be facilitated by using the various die members illustrated.

It is thus apparent that a novel game has been provided which will add interest to the usually dull task of learning the multiplication tables. By enabling the child to play a game in the course of learning these tables and by providing an incentive to win, it is believed that the efforts ordinarily expended by a child in the process of learning the multiplication tables will be greatly increased, and the time in which the tables are completely learned will be greatly shortened. The provided game, as is above apparent, is composed of a number of inexpensive parts which may be composed of wood, plastic, and other ordinary inexpensive material. The manufacture of the game components may be readily effected in a facile manner.

As has been above mentioned, substitute parts may be utilized in the game which will function to equal advantage. For instance, any number of means may be utilized which will provide a child with a random multiplier and multiplicand. Three of such means have been above described. Also, as previously mentioned, the products of the various multipliers and multiplicands need not be disposed on both the game board and game piece bottom surfaces but may be disposed on either game item. It is intended, therefore, that this invention be limited only by the scope of the appended claims.

I claim:

1. A mathematical game comprising a rectangular game board, a series of numbers arranged along two intersecting edges of said game board, each of said series commencing at said intersecting corner, said game board being divided into a number of squares, each of said squares being in alignment with a number from each of said series arranged along said game board edges, removable game pieces positioned on each of said game board squares, and means for providing by chance two numbers arranged along the edges of said game board whereby the players of the game are required to locate the square on the game board in alignment with the two numbers on the edges provided by chance prior to removal of the game piece therefrom.

2. A mathematical game comprising a game board having numerals arranged along a first edge and numerals arranged along a second edge disposed at substantially right angles to said first edge, said board having columns thereon normally disposed to each of said numerals disposed along said first and second edges, said columns defining squares at points of intersection, numbers corresponding to the product of the two numbers with which each of the intersecting columns is normally disposed positioned in each of said squares, game pieces adapted to be positioned on each of said game board squares and means for providing by chance two numbers arranged along the edges of said game board whereby the players of the game are required to locate the square on the game board in alignment with the two numbers on the edges provided by chance prior to removal of the game piece therefrom.

3. A mathematical game comprising a game board having numerals arranged along a first edge and numerals arranged along a second edge disposed at substantially right angles to said first edge, said board having columns thereon normally disposed to each of said numerals disposed along said first and second edges, said columns defining squares at points of intersection, game pieces adapted to be positioned on each of said game board squares, and means for providing by chance two numbers arranged along the edges of said game board whereby the players of the game are required to locate the square on the game board in alignment with the two numbers on the edges provided by chance prior to removal of the game piece therefrom.

4. A mathematical game comprising a rectangular game board, a series of numbers arranged along two intersecting edges of said game board, said series commencing at said intersecting corner, said game board being divided into a number of squares, each of said squares being in alignment with a number from each of said series arranged along said game board edges, removable game pieces disposed on each of said game board squares, each of said game pieces having the product of the two numbers with which the game board square on which positioned is in alignment disclosed on the bottom surface thereof, and means for providing by chance two numbers arranged along the edges of said game board whereby the players of the game are required to locate the square on the game board in alignment with the two numbers on the edges provided by chance prior to removal of the game piece therefrom.

5. A mathematical game comprising a rectangular game board, a series of numbers arranged along two intersecting edges of said game board, said series commencing at said intersecting corner, said game board being divided into a number of squares, each of said squares being in alignment with a number from each of said series arranged along said game board edges, removable game pieces disposed on each of said game board squares, each of said game pieces having the product of the two numbers with which the game board square on which positioned is in alignment disclosed on the bottom surface thereof, each of said game pieces having the two numbers with which the game board square on which positioned is in alignment disclosed on a top surface thereof, and means for providing by chance two numbers arranged along the edges of said game board whereby the players of the game are required to locate the square on the game board in alignment with the two numbers on the edges provided by chance prior to removal of the game piece therefrom.

6. The game as recited in claim 5 in which the game piece surface on which said two numbers with which the game board square on which positioned is in alignment is inclined to the horizontal for purposes of facilitating reading thereof in the normal course of play.

7. A mathematical game comprising a game board, a series of numbers arranged along two edges of said board, said edges being normally disposed to each other, said game board being divided into a number of squares, each of said squares being in alignment with a number from each of said series of numbers, removable game pieces arranged on each of said game board squares, each of said game pieces having the product of the two numbers with which each of said squares is in alignment disclosed on the bottom thereof, a position number disclosed on each of said squares, a corresponding position number disclosed on each of said game pieces, and means for providing by chance two numbers arranged along the edges of said game board whereby the players of the game are required to locate the square on the game board in alignment with the two numbers on the edges provided by chance prior to removal of the game piece therefrom.

8. The game as recited in claim 1 in which said chance means comprises two die members.

9. The game as recited in claim 1 in which said chance means comprises two numbered dial members having a spinner member affixed thereto.

10. A mathematical game comprising a rectangular game board, a series of multipliers arranged along one edge of said board, a series of multiplicands arranged along a second edge of said board, said game board being divided into a number of squares, each of said squares being in alignment with a number from each of said series arranged along said game board edges, removable game pieces positioned on each of said game board squares, each of said squares having two numbers disclosed thereon, said two numbers comprising the numbers in each of said series disposed along said game board with which said square on which said game piece is positioned is in alignment with, means for providing by chance two numbers arranged along the edges of said game board whereby the players of the game are required to locate the square on the game board in alignment with the two numbers on the edges provided by chance prior to removal of the game piece therefrom, said means comprising two dial members disposed on a rigid backing member, a spinner member disposed on each of said dials, said spinner members overlapping when disposed normal to the adjacent dial member, each of said dial members having a plurality of concentric circles, each of said circles being divided into a plurality of segments, numbers disposed in each of said segments.

References Cited in the file of this patent
UNITED STATES PATENTS

| | | |
|---|---|---|
| 898,587 | Matthias | Sept. 15, 1908 |
| 1,302,805 | Jentz | May 6, 1919 |
| 1,719,108 | Fennell | July 2, 1929 |
| 1,946,318 | Hamilton | Feb. 6, 1934 |
| 2,472,439 | Rogers | June 7, 1949 |
| 2,512,837 | Pescatori | June 27, 1950 |
| 2,585,458 | Gordon | Feb. 12, 1952 |
| 2,672,344 | Wakefield | Mar. 16, 1954 |
| 2,769,640 | Elder | Nov. 6, 1956 |